Patented May 9, 1933

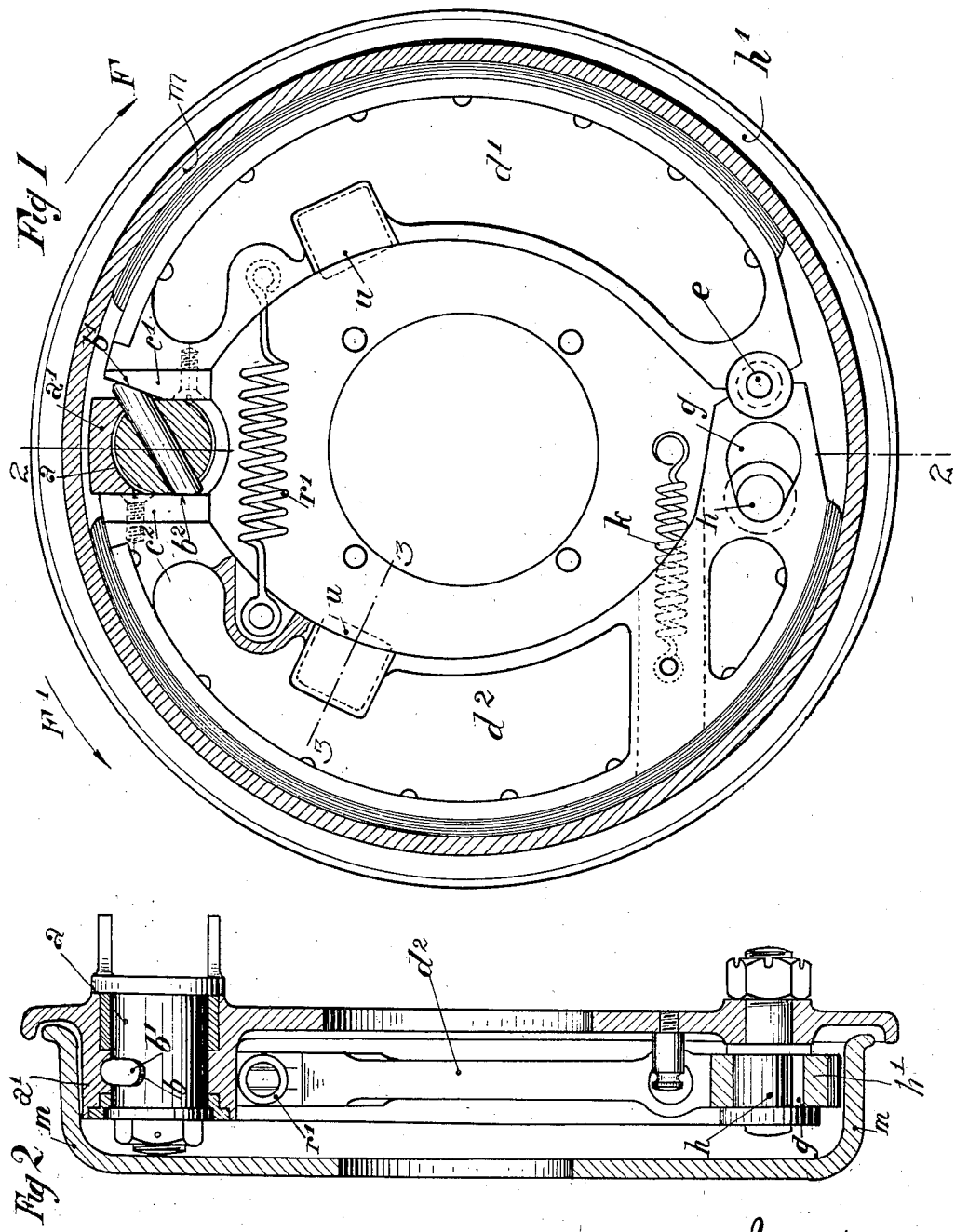

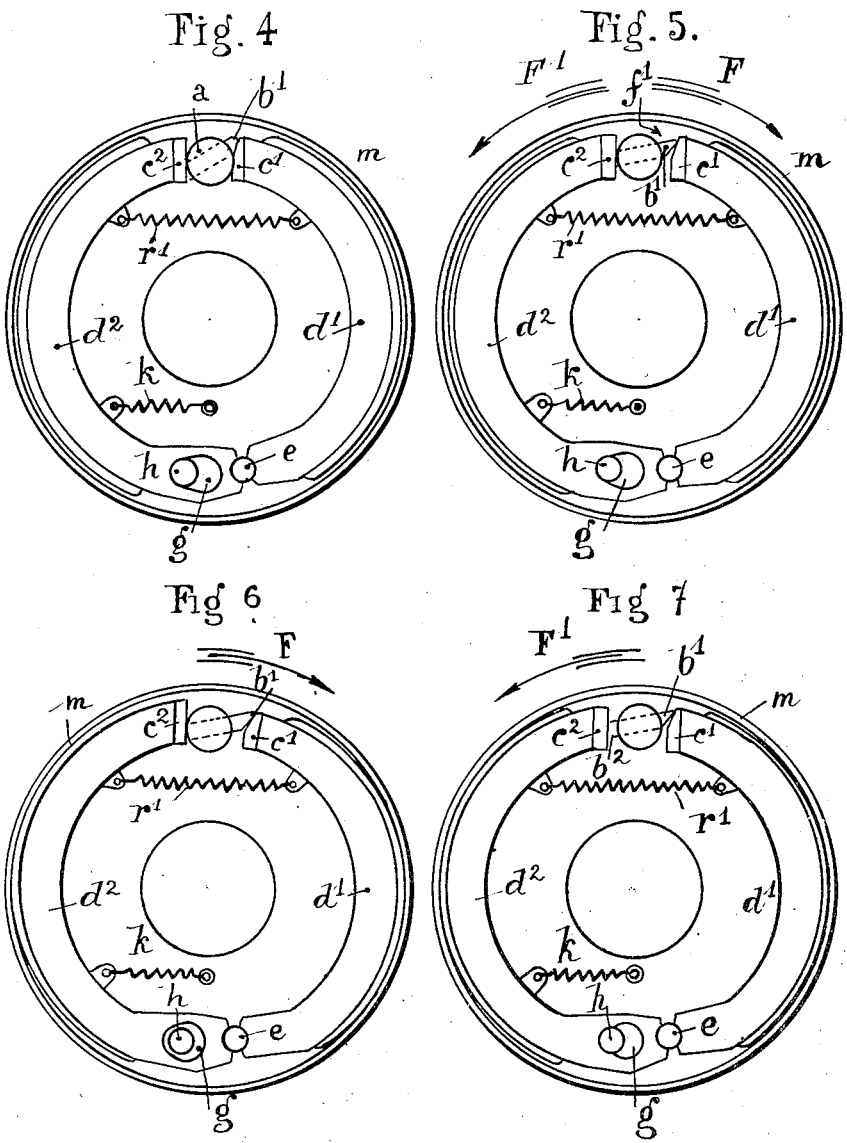
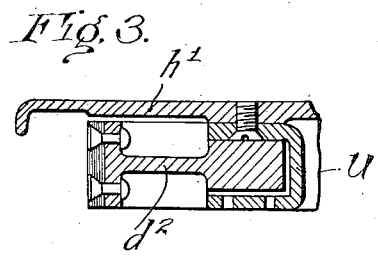

1,907,472

UNITED STATES PATENT OFFICE

RAYMOND ALEXANDRE BABEL AND LOUIS JAQUET, OF CLICHY, FRANCE, ASSIGNORS, BY MESNE ASSIGNMENTS, TO BENDIX AVIATION CORPORATION, OF SOUTH BEND, INDIANA, A CORPORATION OF DELAWARE

BRAKE WITH EXPANDING MEMBERS

Application filed December 7, 1926, Serial No. 153,110, and in France December 12, 1925. Renewed January 10, 1930.

The present invention relates to brakes with expanding members which are controlled by a stud shaft traversed by a shaft which is slidable in the said shaft.

The said push-pin serves to expand the said members or shoes while permitting them to act upon one another for both directions of rotation of the vehicle wheel.

The said shoes, which are connected together by a suitable joint, are not rigidly mounted on the disc which supports the brake. When the brakes are applied during the forward travel of the vehicle, they are suspended solely upon the drum which they brake. The said shaft and push pin acts alone to withstand the thrust of the shoes whereby the latter are held against rotation.

In this braking arrangement for forward travel, the effective braking shoe, i. e. the one in contact with the end of the push pin which is the furthest from the centre of the drum, which is actuated by the drum, will transmit the thrust through the pivot joint to the rear shoe which is thus pressed strongly against the drum.

The braking force obtained by the said arrangement is much superior to that which is obtained by the simultaneous and separate action of the two shoes, and this increase in power justifies the term "servo-brake" by which we designate this apparatus.

In addition to the general features above specified, our brake offers the following features:

(a) The cam surfaces of the push pin are non-symmetrical. The end furthest from the centre of the drum is cut on a bevel and coacts with a beveled ramp formed on the end of the servo-brake shoe and the other end has a flat surface with rounded edges coacting with a straight ramp.

Due to this lack of symmetry in cam surfaces, the rotation of the pin first effects the opening of the servo-brake shoe and the latter when impelled against the drum is then drawn forward by the said drum and causes the rear shoe to open, said shoe having been hitherto in the fixed position. This effect will take place for both directions of rotation of the vehicle wheel. The rear shoe will thus remain against the stud shaft containing the push pin during the stopping period as well as when braking for forward travel.

(b) To avoid all jamming when braking upon back motion, the rear shoe is pierced with a slot enabling it to make contact with a stud pin secured to the disc the said slot and stud pin being situated adjacent the pivot joint.

When the vehicle is inoperative, the said stud pin assures maintenance of the shoes and their centering in the drum by means of a spring which tends to displace the shoes about the drum and a second spring pressing the two shoes together, said shoes contacting with the stud shaft and push pin.

During the braking upon forward travel, the said stud pin, by reason of the slot, does not prevent the movement of the rear shoe against the drum, but when braking upon back motion of the vehicle, it prevents the driving of said shoe by the drum and causes it to pivot on the said stud pin under the action of the push pin which is driven back by the other shoe.

The following description with reference to the appended drawings shows, by way of example, an embodiment of the invention.

Fig. 1 is a front view of the brake, partly in section.

Fig. 2 is a cross section of the device on the line 2—2 of Fig. 1.

Fig. 3 is a section of the line 3—3 of Fig. 1, with the brake drum removed.

Figs. 4 to 7 are diagrammatic views showing the operation of the brake.

Our said brake comprises two shoes $d^1$ $d^2$ which are pivotally mounted on a stud $e$. One of said brake shoes is caused to bear upon a stud pin $h$, mounted on the disc $h^1$ which is secured to the journal of the vehicle axle. Said stud pin engages a slot $g$ formed in the shoe $d^2$. Two springs $k$ and $r^1$ bring the shoes together and maintain the plates $c^2$ $c^1$— forming the ends of said shoes—against the coacting flat faces of the stationary member $a^1$, in which is rotatable the journal $a$ carrying the slidable push pin $b$. The shoes $d^1$ $d^2$ are held against disc $h^1$ by the straps $u$ (Fig. 3), in which the said shoes are engaged with a certain lateral play for allowing proper freedom of movement.

It should be remarked that the end face $b^1$ of the push pin is not parallel with the other face $b^2$, but is much inclined and is pressed against a beveled part of the plate $c^1$. Due to this inclination, the shoe $d^1$ will always be the first to open, by pivoting on the stud $e$ when the stud shaft $a$ is rotated, the shoe $d^2$ being in contact with the stud pin $h$.

The operation is as follows:

Referring to Fig. 4, the brake is in the inoperative position with plates $c^1$ $c^2$ pressed against the abutment $a^1$ (not here shown) by the spring $r^1$. The shoes $d^1$ $d^2$ are centered by the spring $k$ which holds the end of the slot $g$ against the stud $h$.

If it is considered that the vehicle travels forward in the direction of the arrow F, and that the back motion is in the direction of the arrow $F^1$ (Figs. 5 and 6), it will be observed that for the braking action, the movement of the pedal will turn the journal $a$ in the direction of the arrow $f^1$; the push pin $b$ will drive the plate $c^1$ of the shoe $d^1$, by its cam surface $b^1$, until said shoe makes contact with the drum $m$, whilst the shoe $d^2$ remains in the fixed position.

When rotating, the drum $m$ draws the shoe $d^1$ forward in the direction of the arrow F which acts as a servo-brake and drives, through the medium of the stud $e$ (Fig. 6), the brake shoe $d^2$ which in turn, makes contact with the drum $m$ and thus completes the braking operation which has been commenced by the shoe $d^1$, during which motion the two shoes $d^1$ $d^2$ may be said to possess a winding effect in the brake drum.

For the back motion of the vehicle, the first movement of the brake shoes takes place in the same manner as for the forward travel (Fig. 5); but since the drum $m$ turns in the direction of the arrow $F^1$ (Fig. 7) it will draw with it, in this direction, the shoe $d^1$ which will again act as a servo-brake and will drive the pin $b$ to the left, whose cam surface $b^2$ will impel the plate $c^2$ of the shoe $d^2$.

Since shoe $d^2$ is unable to turn in the direction of the arrow $F^1$, it being held by the stud $h$, said shoe will move outward, due to the common pivot stud $e$, by turning upon the stud $h$.

This outward movement of the shoe $d^2$ prevents the brake from jamming, which would invariably take place during the back motion, if the said shoe were driven in the direction $F^1$ by the shoe $d^1$, as occurred in the direction F during the forward travel, i. e. in such manner that it would, so to speak, be wound upon the drum.

It is to be noted that when angular displacement which is given to the shoes $d^1$, $d^2$, and the push pin $b$ around the centre of the brake, the plate $c^1$, acting upon the outer end $b^1$, of the push-piece, i. e. the end furthest from the centre of the brake, will move forward faster in the direction $F^1$ than the plate $c^2$ of the shoe $d^2$ will move backward, the shoe $d^2$ being in contact with the inner end of the push pin $b$, i. e. with the end nearest the centre.

To obviate this jamming effect, the plate $c^2$ must recede faster than it would do in the above-mentioned case, and this in fact, will occur when the shoe $d^2$ moves outward about the stud $e$ by pivoting on the stud pin $h$.

The said brake arrangement is perfectly balanced and provides a progressive and very energetic braking in either direction of travel.

While we have shown what we deem to be the preferable form of our device we do not wish to be limited thereto as there might be various changes made in the details of construction and the arrangement of parts without departing from the spirit of the invention as comprehended within the scope of the appended claims.

What we claim is:

1. In a brake of the type described having a brake drum, and a pair of pivotally connected expansible brake shoes in said drum, the combination of a rectilinear bearing plate on the extremity of one of said shoes, a second bearing plate disposed opposite said first bearing plate on the extremity of said other shoe, a cam surface on said second plate disposed in oblique relation to the surface of said first plate, a rotatably mounted stud shaft disposed between said plates, a pin slidably mounted in said stud shaft, a cam surface on one end of said pin parallelly disposed with respect to said oblique cam surface and a second cam surface on the other extremity of said pin cooperating with said rectilinear plate.

2. A brake according to claim 1 in which said oblique cam surfaces are disposed at a point further from the center of said brake shoes than said second cam surface.

3. A brake according to claim 1 in which one of said brake shoes is provided with an elongated slot and a stationary stop pin extending into said slot.

4. A brake according to claim 1 in which one of said brake shoes is provided with an elongated slot, a stationary pin extending into said slot and means tending to normally cause one end of said elongated slot to bear against said pin.

5. A brake comprising a brake drum, a pair of pivotally connected brake shoes freely mounted in said drum, a rotatable stud shaft disposed between the extremities of said brake shoes opposite the pivot point thereof, a push pin loosely and obliquely mounted in said stud shaft and means whereby forward movement of said drum instigates braking by causing said brake shoes to roll in said drum and whereby rearward movement of said drum instigates braking by causing said shoes to open about their pivot point.

6. A brake comprising a brake drum, a pair of pivotally connected brake shoes freely mounted in said drum, a rotatable stud shaft disposed between the extremities of said brake shoes opposite the pivot point thereof, a push pin loosely and obliquely mounted in said stud shaft, and elongated slot formed in the brake shoe whose extremity is in contact with the extremity of said push pin nearest the center of the drum and a fixed pin engaging in said slot for preventing said brake shoes from rolling in said drum during rearward movement thereof whereby said brake shoes are caused to open about their pivot point.

7. A brake comprising, in combination, a drum, a plurality of floating shoes pivotally connected one to another and having adjacent separable ends, said shoes arranged end to end within the drum and engageable with the drum surface, a stationary abutment positioned remote from said separable ends within the length of one of the shoes, said abutment arranged to take the torque of said shoes in one direction of drum rotation, and an applying device interposed between the aforementioned adjacent ends of the shoes, said device adapted to actuate said shoes into drum contact and transmit braking force from one shoe to the other in one direction of rotation.

8. A brake comprising, in combination, a drum, a plurality of floating pivotally connected shoes arranged end to end within the drum, said shoes having adjacent separable ends, an anchor post interposed within the length of one of said shoes and arranged to take the torque of all of said shoes in one direction of drum rotation, together with applying means interposed between said separable ends, which applying means is so constructed and arranged as to separate said shoes, as well as a coupling between the same, to transmit braking force from one of said shoes to its adjacent shoe.

9. A brake comprising, in combination, a drum, a plurality of pivotally connected shoes arranged end to end within said drum, said shoes having adjacent separable and spaced apart ends, a torque-taking abutment interposed between the length of one of said shoes and arranged to take the torque of the brake in one direction of drum rotation, an applying means interposed between said separable ends of the shoes, said applying means housed within a second torque-taking abutment adapted to receive the braking reaction in one direction of drum rotation.

10. A brake comprising, a drum, a plurality of pivotally connected shoes arranged end to end within the drum having separable adjacent ends, a stop positioned adjacent said separable ends for taking the braking force of all shoes in one direction, and a second stop intermediate the ends of one of the shoes for taking the braking force of all shoes in the reverse direction.

11. A brake comprising a plurality of pivotally connected shoes arranged end to end, means for transmitting braking force from one shoe to another in one direction, a stop for taking the braking force of all shoes in said direction, a second stop positioned within the length of one of the shoes for taking the braking force of all shoes in the reverse direction, and separate means for transmitting braking force from one shoe to another in the reverse direction.

12. A brake comprising a pair of shiftable-anchorage shoes connected by a floating joint, a shaft bearing arranged between the unconnected ends of the shoes and serving as a brake anchorage engaged by said ends, an applying shaft journaled in said anchorage bearing and having a transverse opening, and a lengthwise-slidable thrust member in said opening and engaging said unconnected shoe ends.

13. A brake anchorage formed as a shaft bearing with openings in its opposite sides, a shaft in said bearing having a transverse opening, and a cam slidably arranged in the transverse opening in the shaft and projecting through the openings in the sides of the anchorage bearing.

In testimony that we claim the foregoing as our invention, we have signed our names hereto.

RAYMOND ALEXANDRE BABEL.
LOUIS JAQUET.